(12) United States Patent
Chiaretti et al.

(10) Patent No.: US 7,454,091 B2
(45) Date of Patent: Nov. 18, 2008

(54) INTEGRATED OPTICAL NETWORK WITH CONTROLLED OPTICAL BEAM DEFLECTION AND OPTICAL TRANSMITTER

(75) Inventors: Guido Chiaretti, Novate Milanese (IT); Antonio Fincato, Cameri (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 0 days.

(21) Appl. No.: 11/198,875

(22) Filed: Aug. 5, 2005

(65) Prior Publication Data
US 2006/0029320 A1    Feb. 9, 2006

(30) Foreign Application Priority Data
Aug. 5, 2004    (EP)    ................... 04425611

(51) Int. Cl.
G02F 1/295    (2006.01)
G02B 6/12    (2006.01)

(52) U.S. Cl. ............................................. 385/4; 385/14
(58) Field of Classification Search ....................... None
See application file for complete search history.

(56) References Cited

U.S. PATENT DOCUMENTS

| 5,233,673 A | 8/1993 | Vali et al. |
| 6,049,640 A * | 4/2000 | Doerr ........................... 385/15 |
| 6,385,353 B1 | 5/2002 | Boyne et al. |
| 6,587,076 B2 | 7/2003 | Fuji et al. |
| 2002/0159700 A1 | 10/2002 | Coroy et al. |
| 2003/0223672 A1 | 12/2003 | Joyner et al. |

FOREIGN PATENT DOCUMENTS

| EP | 0756184 A2 | 1/1997 |
| JP | 05323246 | 12/1993 |

OTHER PUBLICATIONS

D. R. Wright, et al., Novel Phased Array Optical Scanning Device Implemented using GaAs/AlGaAs Technology, Applied Physics Letters, American Institute of Physics, vol. 59, No. 8, Aug. 19, 1991.
European Search Report, EP04425611, Dec. 2, 2004.

* cited by examiner

Primary Examiner—Tina M Wong
(74) Attorney, Agent, or Firm—Lisa K. Jorgenson; Marcus S. Simon; Graybeal Jackson Haley LLP (57) ABSTRACT

Integrated optical network comprising:
an array of optical waveguides having respective output ends defining a array of radiating elements, wherein said guides receive respective optical input signals and output said optical signals from said radiating elements to form an optical beam; and
actuator means to introduce in said array of guides relative phase differences between said optical signals in order to deflect the optical beam formed;
characterized in that
the actuator means include at least one actuator track comprising a plurality of track sections substantially aligned with respective optical guides, said sections being fed by a common control signal to locally modify refractive indexes of the respective optical guides in order to introduce said phase differences.

32 Claims, 5 Drawing Sheets

INTEGRATED OPTICAL NETWORK WITH CONTROLLED OPTICAL BEAM DEFLECTION AND OPTICAL TRANSMITTER

PRIORITY CLAIM

This application claims priority from European patent application No. 04425611.3, filed Aug. 5, 2004, which is incorporated herein by reference.

TECHNICAL FIELD

The present invention refers to the technical field of integrated optical devices and in particular concerns an integrated optical network suitable for an electronically controlled deflection of an optical beam. The present invention further concerns an optical transmitter which includes said network.

BACKGROUND

The use of different techniques for controlled moving or deflection in free space of electromagnetic radiation, such as a microwave signal or an optical frequency signal, are well known in the art for various applications.

At present, said deflection techniques are, for example, widely used in optical radar or microwave radar, in space or military applications, optical commutation devices, surveillance systems, etc.

Optical beam deflection techniques using electro-mechanical means which comprise movable mechanical parts for controlled deflection of an optical beam or signal are known. For example, deflection arrangements including electrically controlled rotating mirrors are known in the art.

In some cases the use of deflection instruments with movable mechanical parts is expensive, while in other cases it can be inefficient and give rise to problems. For example, one problem connected to the use of said instruments is caused by the fact that their performance, in some cases, can be significantly influenced by vibrations to which these instruments are subjected. Typically, this can take place when said instruments are intended to be installed on vehicles such as automobiles or aircraft to be used, for example, as radar system transmitting antennas.

Another problem connected to the use of instruments with movable parts can be caused by their dimensions, in some cases incompatible with the dimensions laid down by specific applications. Furthermore, the beam deflection speed is limited by the performance of the mechanical system.

In order to overcome the above-mentioned problems and disadvantages, techniques using systems known as Phased Array Systems have been widely used for some time. Said techniques were originally developed for applications using microwave signals and, subsequently, they were further extended to the field of optical frequency signals.

Using said technologies, it is possible to move or deflect into free space an optical signal or a microwave signal, by making a plurality of signals emitted from respective radiating elements interfere with each other and varying and controlling the reciprocal phase differences between said emitted signals.

Controlled variation of phase differences between signals is obtained typically by varying respectively the dielectric constant or the refractive index of the means through which the microwave or optical signals respectively are propagated.

A particular example of a phased array beam scanning antenna for a microwave car radar is described in the U.S. Pat. No. 6,587,076.

Despite the fact that the phased array technology is now consolidated in applications using microwave signals, the use of said technology still presents some problems in applications using optical frequencies. Said problems are mainly connected to the typical dimensions of the circuits using optical signals. In fact, said dimensions are strictly connected to the wavelengths of the optical signals which are much smaller than the characteristic wavelengths of microwave signals. Accurate control of the dimensions of the optical paths is indispensable for accurate control of the phase differences.

An example of a device suitable to deflect an optical beam based on the phased array technology is described in U.S. Pat. No. 5,233,673.

In said document, a deflectable optical beam is obtained by controlled interference between a plurality of signals emitted from a respective plurality of optical emitters supplied by respective optical guides and arranged along a linear axis. The principle of the control method is based on the piezoelectric effect or the electro-optical effect. However, control is complicated and insufficient since it has to control a number of phase differences between signals proportional to the number of optical emitters used. Furthermore, another problem left unresolved by the above-mentioned U.S. Pat. No. 5,233,673 is that of a possible undesired coupling between the optical guides.

SUMMARY

An aspect of the present invention is to provide an integrated optical network with suitably controlled optical beam deflection, without at least some of the above-mentioned disadvantages of the known art.

An optical network and optical transmitter according to embodiments of the present invention are set forth, in the following description.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
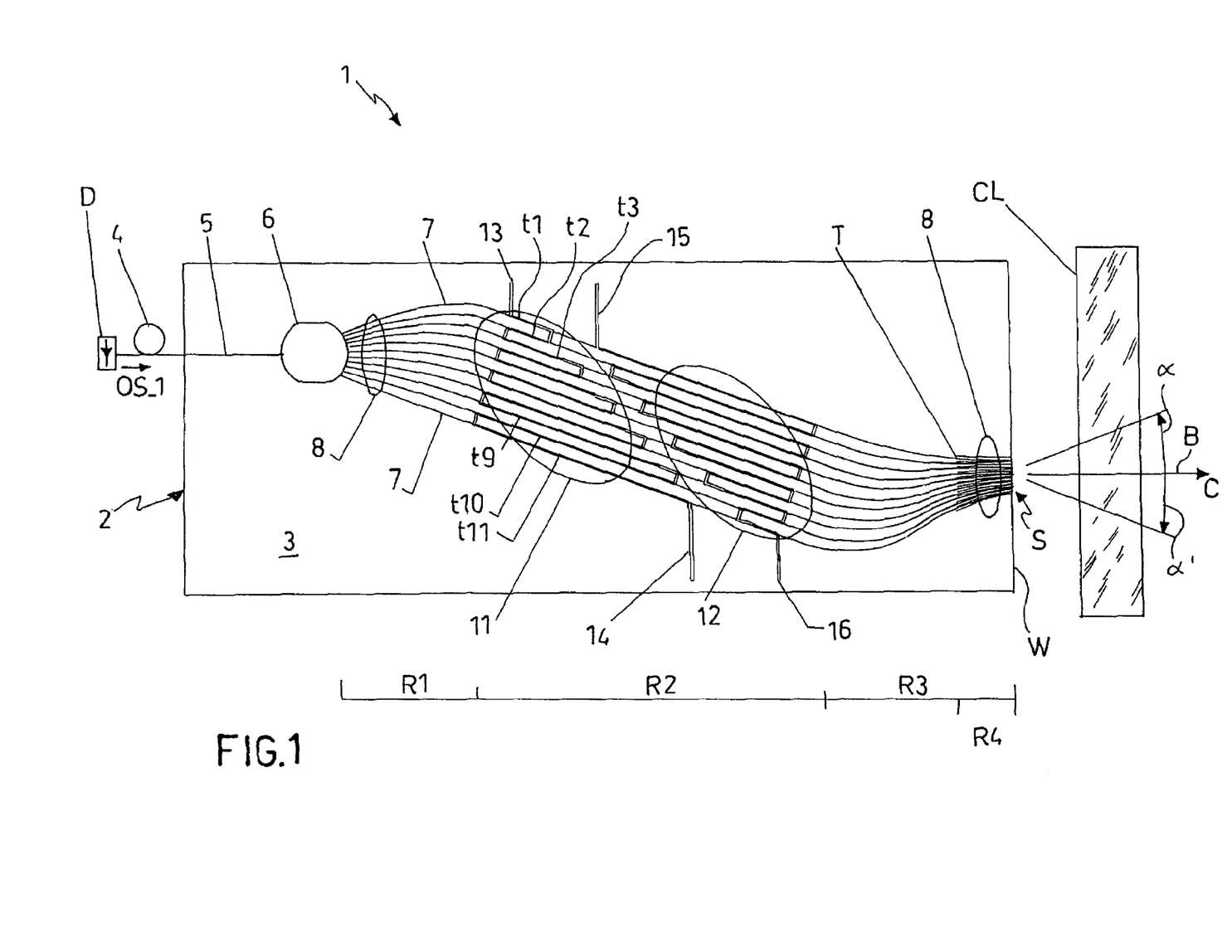
FIG. 1 is a schematic view from above of an optical transmitter comprising an integrated optical network according to an embodiment of the invention.

FIG. 1 represents a schematic view from above of an optical transmitter, generally indicated with 1, suitable to produce an outgoing signal or optical beam B. The optical transmitter 1 can, for example, be advantageously used, but without introducing any limitations thereto, as a car radar transmitting antenna.

In particular, the optical transmitter 1 is such as to provide an outgoing collimated optical beam B having a controlled variable direction of travel. Preferably, the optical beam B can be directed in such a way as to lie substantially on a plane to scan an arc α, α' with a periodic movement. For example, the optical beam B can be deflected in such a way as to scan the arc portion α moving away from an initial position C substantially in the center of the arc α, α', return to said initial position C passing through the arc α in the opposite direction, scan the arc portion α' moving away from said initial position C and return to said initial position C passing through the arc α' in the opposite direction.

In a preferred embodiment where the transmitter 1 is used as a car radar antenna, the arc α, α' has an aperture equal to approximately 30° and the beam B can be continuously directed to scan said arc moving parallel to the road surface.

The optical transmitter 1 preferably comprises: an optical source D, an integrated optical network generally indicated with 2, means for optical coupling 4 between the optical source D and the optical network 2.

In another preferred embodiment, the optical transmitter 1 further comprises a collimator lens CL, for example cylindrical, to collimate the optical beam B being output from the optical transmitter 1. For example, in the case the transmitter 1 is used as a car radar antenna, the cylindrical lens CL is such as to collimate the optical beam B in a direction substantially perpendicular to the road surface.

The optical source D preferably includes a laser, more preferably a semiconductor diode laser, such as to provide an outgoing optical signal OS_1. Preferably, the optical signal OS_1 is a continuous optical signal with a wavelength within the infrared spectrum, for example equal to approximately 1550 nm. In a variation of the embodiment, the optical source D comprises a LED instead of a diode laser.

The integrated optical network 2 is, preferably, an optical network produced on a chip 3, for example of the PLC (Planar Lightwave Circuit) type. More preferably, the integrated optical network 2 is produced according to a technology known as silica-over-silicon.

Said technology is known to those skilled in the art and, therefore, will not be described in greater detail.

The integrated optical network 2 comprises an input optical waveguide 5 for receiving the optical signal OS_1 provided by the optical source D.

The optical coupling means 4, preferably including a single-mode optical fiber, enable optical coupling of the source D to the input optical waveguide 5 of the integrated optical network 2.

In an embodiment variation, the optical source D is produced directly on the chip 3 of the integrated optical network 2. In this particular case, the use of coupling means 4 is not required.

In a further variation of the embodiment, the optical source D is coupled to the input optical waveguide 5 by means of propagation into free space of the outgoing optical signal OS_1.

The integrated optical network 2 further comprises a plurality 8, or array, of optical waveguides. Preferably, said optical guides are substantially isolated, i.e. uncoupled, from each other and preferably they are produced in such a way as to have well-controlled lengths and refractive indexes.

In the embodiment in FIG. 1, the integrated optical network 2 includes the array 8 comprising eleven optical waveguides. Preferably, said optical guides have substantially equal refractive indexes and lengths. Alternatively, said optical guides have lengths and refractive indexes defining, for all guides, the same optical path for an optical signal which is propagated in said guides.

The integrated optical network further comprises optical coupling means to connect the input optical guide 5 to the array 8 of optical waveguides. Said optical coupling means include, for example, a power divider 6 connected to the input end of the optical waveguides 8 and connected to the output end of optical guide 5.

By means of the power divider 6, the optical signal OS_1 received from the input optical guide 5 can be subdivided into a plurality of outgoing optical signals each propagating in a respective optical waveguide of the array 8. Preferably, said subdivision takes place in such a way as maintain a fixed phase relation between the optical signals being output from the power divider 6.

In another preferred embodiment, the power divider 6 is a balanced power divider, i.e. it equally divides the power of the signal OS_1 between the plurality of optical waveguides of the array 8. More preferably, the power divider 6 may be a star coupler. The use of a star coupler is particularly advantageous since this type of coupler is practically insensitive to the wavelength of the optical signal OS_1 at the input of the coupler 6.

Moreover, a star coupler 6 has further advantages in that it can be produced with any number whatsoever of optical waveguides in the array 8, it has low losses (especially when the number of waveguides in the array 8 is high) and it enables precise control of the phase differences of the optical signals at the output of the divider 6 itself.

The optical guides of the array 8 terminate with respective output ends which, together, define a array of apertures S, or radiating elements, through which the outgoing optical signals, after propagation in the plurality of optical guides in the array 8, are made available on the outside of the chip 3, for example for propagation in free space.

The outgoing optical signals from the array of apertures S, propagating in free space, interfere with each other so forming the beam or outgoing optical signal B.

Preferably, as illustrated in FIG. 1, the array of radiating elements S includes end portions of the optical guides in the array 8 placed on a lateral wall W or output wall, of the chip 3 and arranged in such a way as to be substantially aligned with each other along an axis.

If the integrated optical network 2, and in particular the power divider 6 and the array 8 of optical waveguides, is designed so that optical signals in phase with each other are output from the array of apertures S, the optical signal B resulting from the interference of said signals has a field spatial distribution very similar to the field distribution associated to the signal produced by an array of apertures hit by a plane wave. In this case, the outgoing optical beam B is substantially directed in a direction perpendicular to the alignment axis of the array of apertures S.

Figure 2:
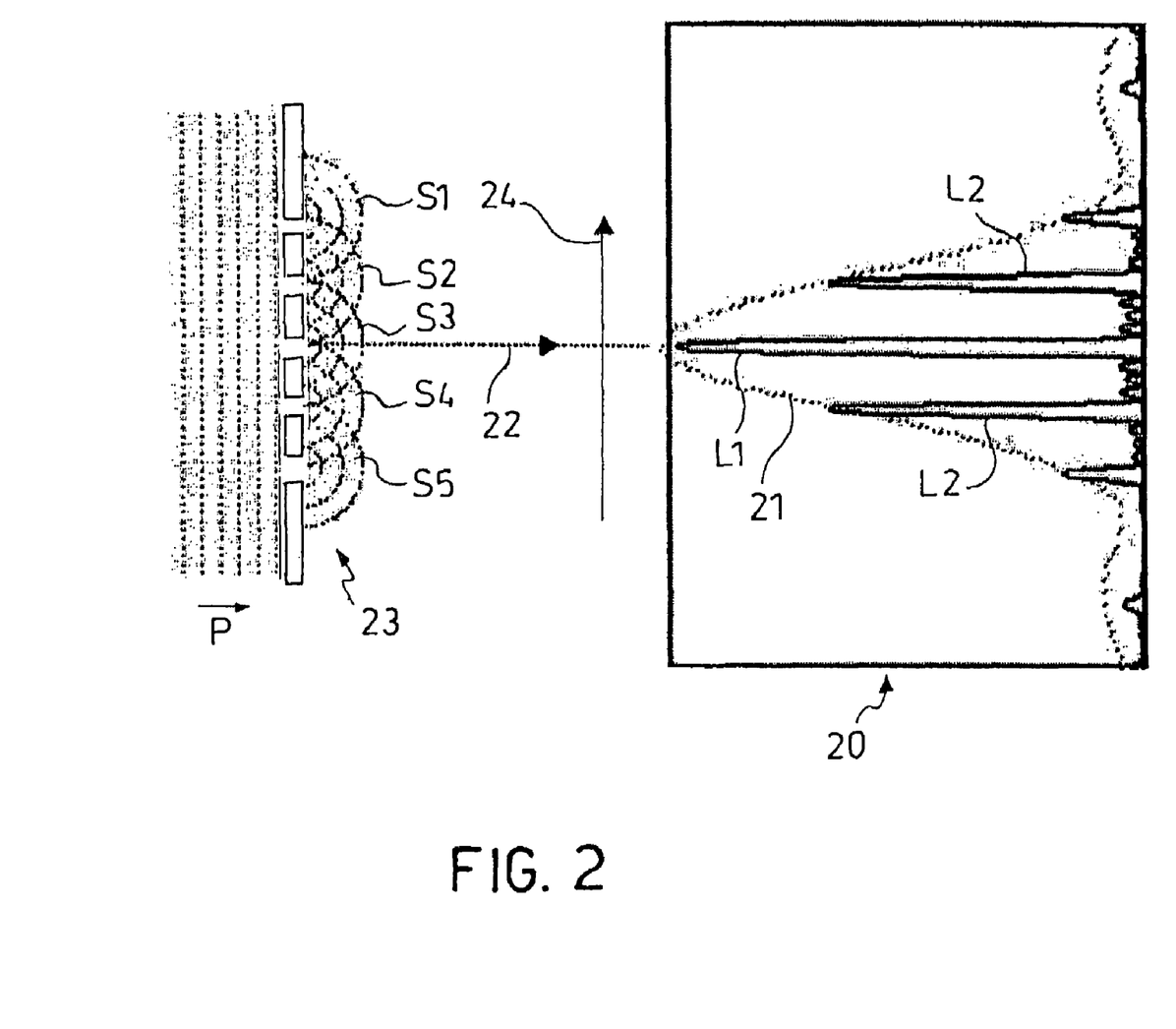
FIG. 2 illustrates field space distribution of a signal being output from a plurality of slits struck by plane wave electromagnetic radiation.

Concerning this, FIG. 2 schematically represents a lateral cross-section of an array of aligned apertures 23, hit by electromagnetic radiation P in the form of a plane wave.

The plane wave P hits the array of apertures 23 and breaks up into a plurality of electromagnetic radiations in the form of spherical waves s1, . . . ,s5 which propagate in the direction indicated with 22 perpendicular to the alignment direction of the array of apertures 23. As can be seen in FIG. 2, each of the spherical waves s1, . . . ,s5 is emitted from a respective aperture.

The resulting electromagnetic field in a far-field region is the field produced by the interference of the spherical waves s1, . . . ,s5.

FIG. 2, box 20, represents the spatial distribution of the intensity of the field (or interference figure) along the axis 24 transversal to the propagation direction 22. Said distribution has a main lobe L1 and numerous other lobes, among which the two secondary lobes L2. An envelope 21 of the field distribution is shown. The shape of said envelope depends on the dimensions of the apertures of the array 23.

The main lobe L1 becomes narrower as the number of apertures of the array 23 becomes greater, while the distance between the secondary lobes L2 and the main lobe L1 becomes greater as the inter-axis distance between the apertures of the array 23 becomes smaller.

Returning to the transmitter illustrated in FIG. 1, it should be noticed that, on the basis of the above, the main lobe (or main optical beam) must be narrow and well separated from the secondary lobes in order that the optical signal B be approximately to an optical beam, for example having a shape suitable for use in radar. In this case, the optical signal B for the specific use is approximately to a beam substantially corresponding to its main lobe.

For this reason, the array of apertures S preferably comprises numerous apertures (for example, more than eight) with a very small inter-axis between them (for example, comparable with the dimensions of the core of the optical guides).

Moreover, as is known to those skilled in the art, the dimensions of the single apertures of the array S must be sufficiently small to produce an envelope 21 of the spectrum 20 with a main envelope lobe having an aperture at least equal to the scanning angle $\alpha$, $\alpha'$ required by the project specifications.

The region of the integrated optical network 2 between the star coupler 6 and the array of apertures S constitutes a controlled phase delay region and preferably comprises an initial transition region R1 where the optical guides 8 move progressively away from each other, an intermediate region R2 where the optical guides 8 remain substantially parallel to each other and a final transition region R3 where the optical guides 8 move progressively towards each other.

In a particularly advantageous embodiment, the final transition region R3 includes an adiabatic transition region R4 where the optical guides 8 reciprocally move towards each other, very gradually reducing their relative distance.

In a particularly advantageous embodiment, in the adiabatic transition region R4, the optical guides 8 move towards each other very slowly in order to curb, in each optical guide 8, the phenomenon of radiation from the guiding or core region of the optical guide 8 to the external or cladding region of the optical guide 8.

Advantageously, this makes it possible to reduce losses of the integrated optical network 2 to a minimum. In order to reach this objective, it is necessary to keep the bending radius of each optical guide 8 always higher than a minimum limit value which depends on the type of guide and is substantially linked to the difference in refractive index between the core and the cladding.

Moreover, in a particularly advantageous embodiment, the adiabatic transition region R4 includes de-coupling means placed between the various optical guides 8, suitable to guarantee good insulation between them.

Figure 3:
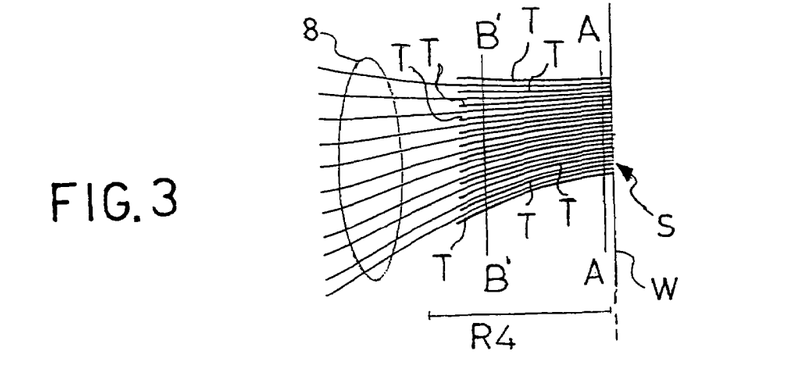
FIG. 3 illustrates a detail of an optical transmitter according to an embodiment of the present invention.

FIG. 3 illustrates an enlarged detail of FIG. 1.

As illustrated in FIG. 3, in a particularly advantageous embodiment, the de-coupling means of the adiabatic transition region R4 include insulation trenches T placed between adjacent optical waveguides.

In the particular embodiment in FIG. 3, the integrated optical network includes eleven optical waveguides 8 in the array and includes twelve insulation trenches T.

Said trenches make it possible to increase the lateral confinement of the optical signals which propagate in the waveguides 8 of the array.

Figure 4:
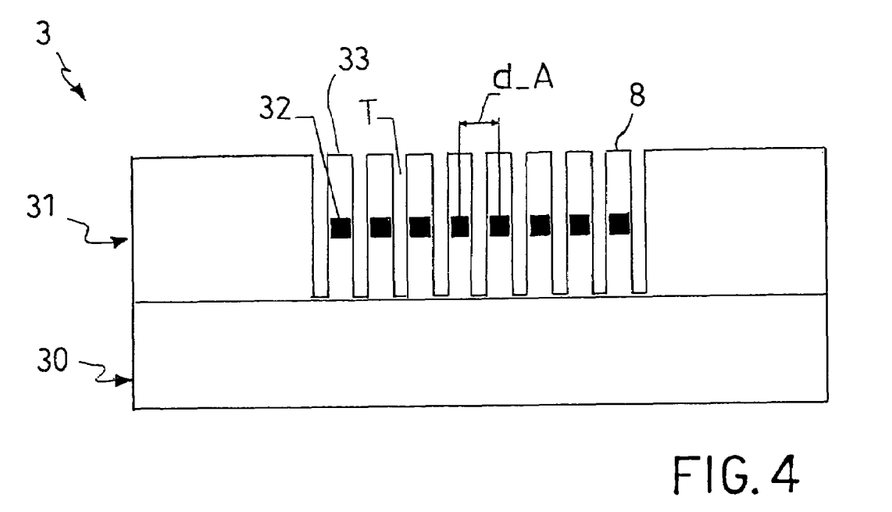
FIG. 4 illustrates a first lateral cross section of the optical transmitter of FIG. 3.

FIG. 4 shows a cross-section of the adiabatic transition region R4 of FIG. 2, in particular the section along the axis A-A (for simplicity, only eight optical wave guides 8 are illustrated).

In this section, the silicon layer 30 of the chip 3 is visible as well as the glass layer 31 deposited on the silicon layer 30.

The optical guides 8 are formed inside the glass layer, each including a core region 32 and a cladding region 33.

The optical guides 8 are separated from each other by vertical insulation trenches T. Advantageously, the trenches T enable good lateral confinement without compromising propagation, even when the inter-axis d_A between adjacent optical guides 8 is very small (for example, approximately the size of the core 32 of the optical guides in the array 8).

In a particularly advantageous embodiment, the trenches T are such as to move slowly and reciprocally towards each other as they gradually draw near to the array of apertures S, or to the output wall W of the chip 3, for example as illustrated in FIG. 3. In this way, the guided field in the core 32 of each optical guide 8 is not radiated into the cladding 33 of the guide itself, so avoiding to induce a loss.

Figure 5:
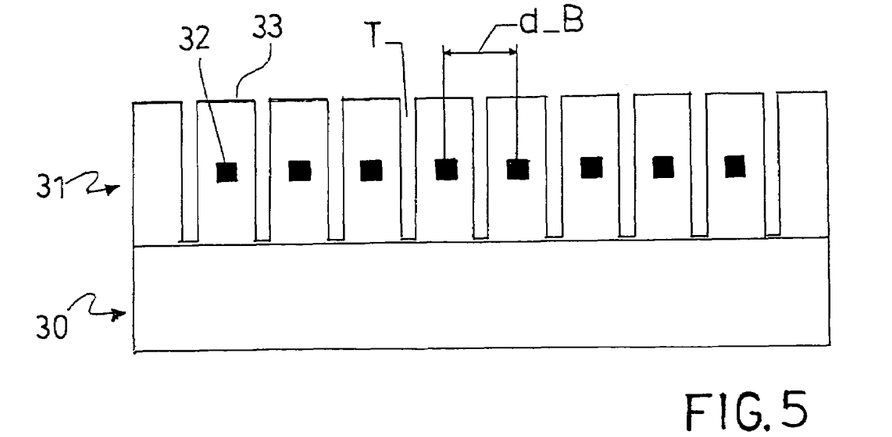
FIG. 5 illustrates a second lateral cross section of the optical transmitter of FIG. 3.

FIG. 5 gives a cross-section of the adiabatic transition region R4 of FIG. 3, in particular the section along the axis B'-B' (as in FIG. 4, for simplicity only eight optical waveguides in the array 8 are illustrated).

As can be seen by comparing FIGS. 4 and 5, preferably the distance between the core 33 of a guide 8 and the two trenches T adjacent to it decreases as the optical guides 8 gradually move towards the output wall W. More preferably, the maximum distance is such as not to influence the guided mode which propagates in the optical guide 8 and the variation in said distance to the output wall W is such as to induce an adiabatic transition of the mode itself. In other words, preferably, at the section B'-B' the inter-axis d_A between the optical guides 8 is sufficiently large and the width of the trenches T is sufficiently small as not to modify the guided field in each optical guide 8.

With reference to FIG. 1, the integrated optical network 2 advantageously further comprises actuator means which can be activated by a control signal to vary the refractive index of the optical guides of the array 8 of the integrated optical network 2, in order to locally modify the refractive index and consequently vary selectively the optical path of the various optical signals which cross the optical guides 8 themselves.

As illustrated in the particular embodiment in FIG. 1, the actuator means include at least a first actuator 11 comprising an actuator track which, for example, crosses the array of optical waveguides 8 and which includes track sections t1,t2, t3, . . . ,t9,t10,t11 substantially aligned to sections of respective optical guides 8. Preferably, said actuator track sections t1,t2,t3, . . . ,t9,t10,t11 are substantially parallel to the sections of the respective optical guides and are substantially superimposed on them.

In a particularly preferred embodiment, the actuator track is an electrically conductive continuous track produced by means of a process of deposition over the optical guides 8.

Advantageously, said track sections t1,t2,t3, . . . ,t9,t10,t11 can be fed by a common control signal to locally modify the refractive index of the optical guide sections underlying said track sections and introduce controlled phase differences between optical signals which propagate in said optical guides.

Preferably, the track sections t1,t2,t3, . . . ,t9,t10,t11 are parallel and superimposed on the optical guides of the array 8 are connected to each other by track connection sections, in the embodiment substantially transvere to the optical waveguides 8.

It should be observed that in the embodiment in FIG. 1, the actuator track 11 has a serpentine-like arrangement with a substantially linear ramp envelope. Furthermore, the rising/falling edges of said serpentine are track sections t1,t2,t3, . . . ,t9,t10,t11 superimposed on the respective waveguides 8.

As can be seen in FIG. 1, the actuator track 11 includes, at the two opposite end portions, a pair of electrical control terminals 13 and 14 for the application of the electronic control signal.

Figure 6:
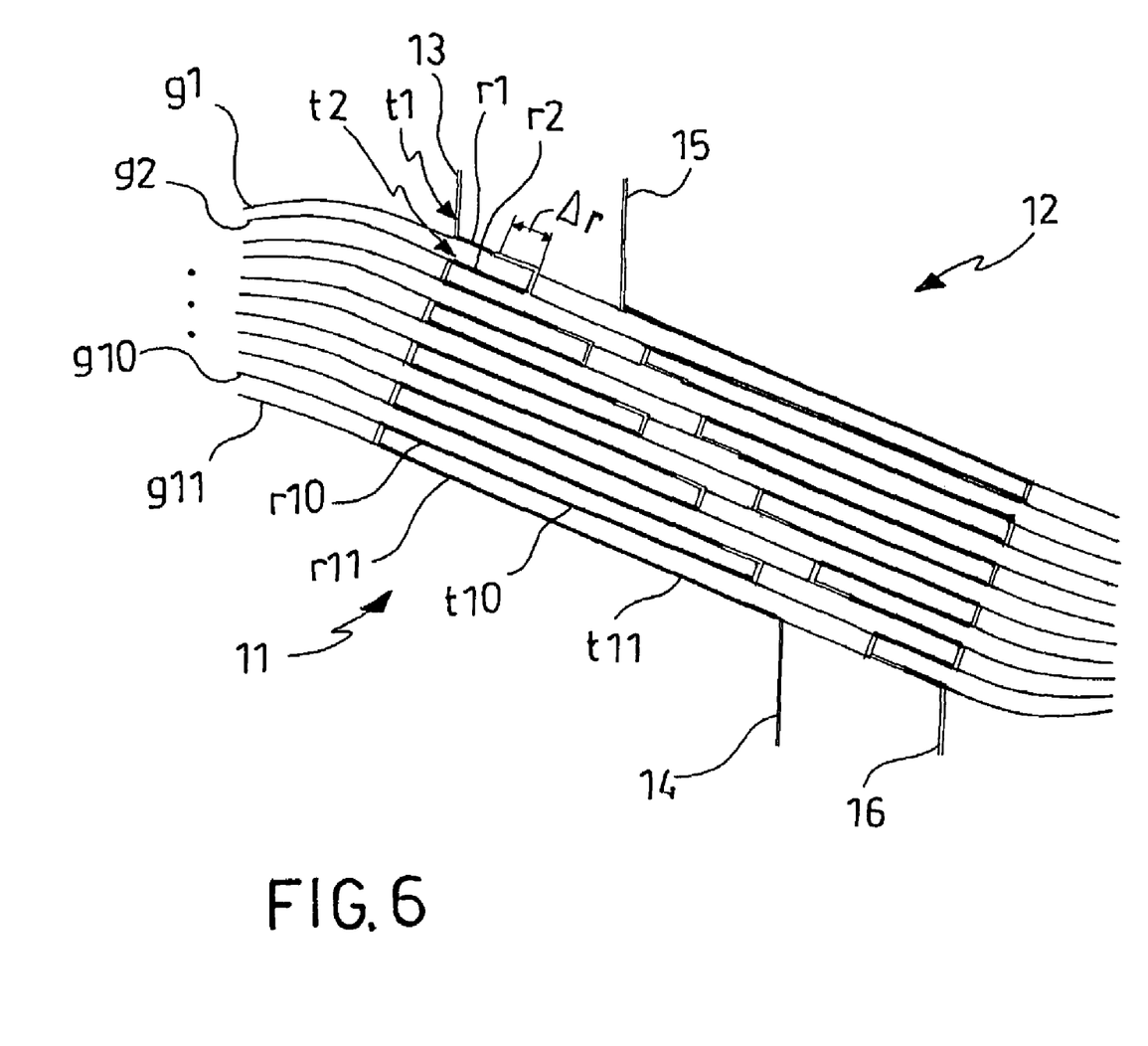
FIG. 6 illustrates an enlarged detail of the optical transmitter of FIG. 3.

FIG. 6 shows in greater detail the actuator track 11 illustrated in FIG. 1.

As can be seen in FIG. 6, the actuator track 11 has track sections t1,t2, . . . ,t10,t11 substantially parallel to sections of respective optical guides g1,g2, . . . ,g10,g11 and substantially superimposed on them.

Preferably, each of the actuator track sections t1, . . . ,t11 which is superimposed on respective optical guides g1, . . . ,g11, includes a respective delay element (or portion) r1,r2, . . . ,r10,r11 which extends entirely or partially along said actuator track section. Said delay element r1,r2, . . . ,r10,r11 makes it possible to locally modify the refractive index of the portion of the optical guide g1,g2, . . . ,g10,g11 underlying it.

For example, with reference to FIG. 5, it should be observed that the actuator track 11 comprises a track section t1 superimposed on the optical guide g1. The track section t1 comprises a delay element r1 which extends along part of the track section t1, leaving a portion ΔR of said track section uncovered.

On the contrary, the track section t2, superimposed on guide g2, comprises a delay element r2 which extends along the entire length of the track section t2.

In a particularly preferred embodiment:
- the delay elements r1,r2, . . . ,r10,r11 are resistive elements;
- the rest of the actuator track 11 is composed of low resistivity conductive paths suitable to connect said resistive elements in series;
- the electronic control signal is an electric current which, going through said resistive elements, heats the underlying optical guides as a result of the Joule effect and induces local variations in their refractive index through thermo-optical effect. In fact, the refractive index of the glass depends on its temperature.

If, as shown in the figures, said resistive elements r1, r2, . . . ,r10,r11 have the same specific resistance but different lengths, it is possible to introduce, by means of a single electronic control signal, different delays on distinct optical guides g1,g2, . . . ,g10,g11. More in detail, if the resistive elements r1,r2, . . . ,r10,r11 have respectively increasing lengths, increasing delays will be introduced into the respective optical waveguides g1,g2, . . . ,g10,g11.

In the embodiment in FIGS. 1 and 6, the delay elements, which in this embodiment are resistive elements r1, . . . ,r11, have differing lengths so that the difference in length between delay elements associated to any couple of adjacent guides is substantially constant. In FIG. 3, said difference in length corresponds to the section indicated with ΔR.

Advantageously, this makes it possible to introduce linear phase differences between the optical signals which propagate in the array 8 of optical waveguides g1,g2, . . . ,g10,g11. For example, an electronic control signal, such as a constant electric current flowing in the actuator track 11, is such as to introduce a phase difference Δφ between the optical signals which propagate in the guides g2 and g1 respectively, a phase difference equal to 2Δφ between g3 and g1 and so on.

A linear phase difference between the optical signals passing through the optical guides g1,g2, . . . ,g10,g11 of the array 8, is such as to change the direction of the optical beam B outgoing from the array of apertures by an angle which depends on the phase difference Δφ between optical signals which propagate in the consecutive optical guides in the array 8.

Said phase difference can be accurately adjusted by varying the intensity of the control current which feeds the actuator track 11, in such a way as to enable deflecting of the outgoing optical beam B in any direction whatsoever and, therefore, in such a way as to scan the arc α, α'. Furthermore, if said control current is made to vary in continuous mode, scanning of the arc α, α' will also be a continuous type scanning.

With reference to FIG. 1 it should be observed that, if the optical guides in the array 8 are made in such a way as to define substantially equal optical paths in the absence of the control current, by activating the actuator track 11 through the control current it will be possible to move the optical beam B in two directions so that it passes through the arc α.

To make the optical beam B also pass through the arc α', a second actuator track 12 is necessary having a substantially complementary geometry to the first actuator track 11 and which can be activated/controlled by means of a further control current applied to the terminals 15 and 16.

Figure 7:
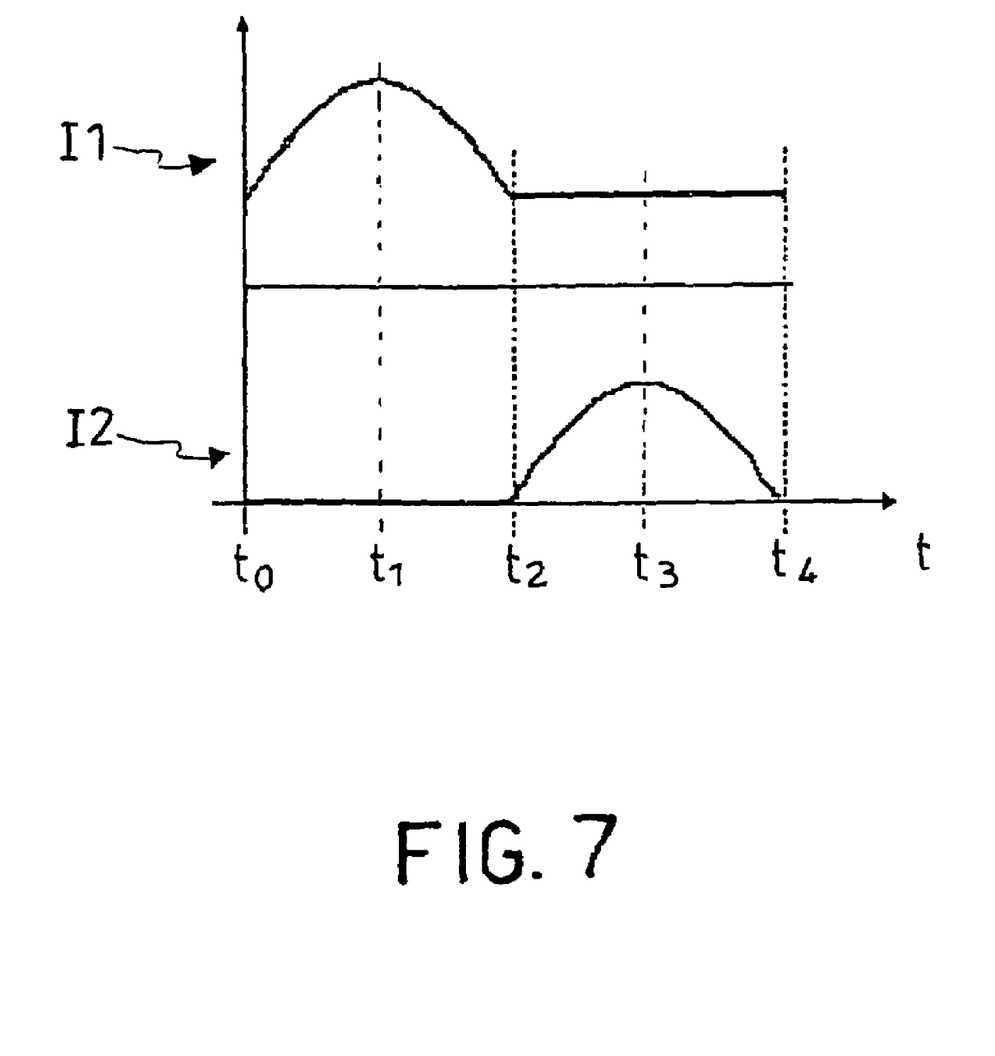
FIG. 7 illustrates wave forms of signals which can be used to control the integrated optical network of FIG. 1.

With reference to FIGS. 1 and 7, a brief explanation of the behavior of the optical transmitter will now be given.

FIG. 7, represents the time diagram of two control currents I1 and I2 which can be used to control the first 11 and the second 12 actuator track, respectively.

At an initial time $t_0$, the laser D is activated and emits the optical signal OS_1, which in this embodiment is a continuous optical signal which feeds the integrated optical network 2.

Since, at the initial time $t_0$, the two currents I1 and I2 have a value substantially equal to zero, the two actuator tracks 11 and 12 are disabled and the outgoing optical beam B of the integrated optical network 2 is in the initial position/direction indicated with C.

After the time $t_0$, the current I1 starts to have a progressively increasing intensity while the current I2 continues to be substantially zero.

Consequently, the first actuator track 11 induces local variations in the refractive index in the array of optical guides 8. The second actuator track 12 is on the contrary disabled.

In these conditions, the beam B is deflected from the initial position C passing through the arc α. At time $t_1$ the current I1 reaches its maximum value, near which the beam B ends a first complete scan of the arc α.

During the time interval between $t_1$ and $t_2$, the intensity of the current I1 progressively decreases and the optical beam B is deflected so as the pass through the arc α in the opposite direction, returning to its initial position C at time t2. At that time, both the control currents I1 and I2 are substantially zero.

After the time $t_2$ the current I2 starts progressively increasing its intensity while the current I1 has a value of substantially zero.

Consequently, the second actuator track 12, activated and fed by the current I2, induces local variations in the refractive index in the array of optical guides 8. The first actuator track 11 is on the contrary de-activated.

In these conditions, the beam B is deflected from the initial position C and passes through the arc α'. At time $t_3$ the current I2 reaches its maximum value, near which the beam B ends a first complete scan of the arc α'. During the time interval between $t_3$ and $t_4$, the intensity of the current I2 progressively decreases and the optical beam B passes through the arc α' in the opposite direction, returning to its initial position C at time $t_4$.

On the basis of the above, it can be observed that the present invention advantageously makes it possible to deflect an optical beam B without requiring the use of mechanical rotating components.

Moreover, it should be observed that an integrated optical network 2 according to this embodiment of the invention can be produced with normal photo-lithographic techniques which today guarantee remarkable precision at a reasonable cost.

It should also be observed that, independently from the number of integrated optical guides used to form the outgoing optical beam, only two simple control signals are required to deflect said beam.

Furthermore, despite the fact that a particular embodiment of an integrated optical network 2 comprising two actuator tracks 11 and 12 has been described, it must be observed that it would be possible to produce an array 8 of optical guides with phase differences between the different optical paths such as to produce, in the absence of actuator tracks, an optical beam initially directed near one end of the scanning arc α, α'. In this case, a single actuator track 11 and a single control signal would be sufficient to deflect the optical beam B along the entire scanning range α, α'.

Furthermore, despite the fact that an embodiment of an integrated optical network has been described in detail, where control of the refractive indexes of the array 8 of the optical guides is obtained by exploiting the thermo-optical effect, it is possible to modify the optical network in FIG. 1 to control the refractive indexes of the optical guides by exploiting the electro-optical effect or the elasto-optical effect (or piezo-optical effect).

In particular, to exploit the electro-optical effect, it is sufficient to produce the array 8 of optical guides in a material whose refractive index depends on the electric field (such as, for example, lithium niobate). In this case, the actuator tracks 11 and 12 with resistive elements in FIG. 1 would be replaced with simple conductive tracks (having the same shape as the actuator tracks 11 and 12). The integrated optical network 2 should also be produced on a metallic plane or layer so that a voltage suitable to produce an electric field acting on the array of optical guides can be applied between said plane and the conductive tracks.

A different embodiment, but not further described since easily derivable by the skilled-in-the-art on the basis of the above teachings, would envisage exploitation of the piezo-optical effect rather than the thermo-optical effect or the electro-optical effect.

Naturally, in order to satisfy contingent and specific requirements, a person skilled in the art may apply to the above-described integrated optical network and optical transmitter embodiments of the invention many modifications and variations, all of which, however, are included within the scope of the invention as defined by the appended claims.

The invention claimed is:

1. An integrated optical network, comprising:
   an array of optical waveguides having respective output ends defining an array of radiating elements, the waveguides being able to receive respective optical input signals and output the optical signals, the array configured so that the optical signals interfere with each other to form an optical beam;
   actuator means to introduce in the array of waveguides relative phase differences between the optical signals in order to deflect the optical beam formed, wherein the actuator means include at least one actuator track comprising a plurality of track sections substantially aligned with respective optical guides, the sections being fed by a common control signal to locally modify refractive indexes of the respective optical guides in order to introduce the phase differences; and
   wherein the array includes optical guides having substantially the same length and the same refractive indexes or, alternatively, defining the same optical path for an optical signal which passes through the optical guide.

2. The integrated optical network according to claim 1, wherein said track sections are substantially parallel and superimposed on the respective optical guides.

3. The integrated optical network according to claim 1, wherein said aligned track sections are connected to each other by means of connection sections substantially transversal to said optical guides.

4. The integrated optical network according to claim 1, wherein said track has a substantially serpentine-like arrangement with a substantially linear ramp envelope.

5. The integrated optical network according to claim 1 including, near its opposite end portions, a pair of electrical control terminals for applying said electronic control signal.

6. The integrated optical network according to claim 1, wherein said refractive indexes are modified by electro-optical effect.

7. The integrated optical network according to claim 1, wherein said refractive indexes are modified by elasto-optical effect.

8. The integrated optical network according to claim 1, wherein said refractive indexes are modified by thermo-optical effect and wherein said control signal is a control current.

9. The integrated optical network according to claim 7, wherein said actuator track is an electrically conductive continuous track obtained by a process of deposition on said array of optical guides.

10. The integrated optical network according to claim 8, wherein said track sections include respective resistive elements which extend entirely or partially along said track sections and wherein the remaining part of said actuator track comprises conductive tracks with low resistivity suitable to connect said resistive elements in series.

11. The integrated optical network according to claim 10, wherein said resistive elements have different lengths and have substantially the same specific resistance.

12. The integrated optical network according to claim 11, wherein said resistive elements have different lengths so that the difference in length between resistive elements associated to any pair of adjacent guides is substantially constant.

13. The integrated optical network according to claim 1, wherein said array of optical guides defines a controlled phase delay region and comprises:
- an initial transition region where the optical guides diverge progressively from each other;
- an intermediate region where the optical guides remain substantially parallel to each other; and
- a final transition region where the optical guides get progressively closer to each other.

14. The integrated optical network according to claim 13, wherein said final transition region includes an adiabatic transition region where the optical guides get closer to each other, very gradually reducing their relative distance.

15. The integrated optical network according to claim 14, wherein said adiabatic transition region includes de-coupling means placed between the optical guides of the array to guarantee good insulation between them.

16. The integrated optical network according to claim 15, wherein said de-coupling means include insulation trenches.

17. The integrated optical network according to claim 1, further comprising:
- an input optical waveguide to receive an input optical signal;
- optical coupling means to connect said input guide to the array of guides, subdividing the input optical signal so as to supply said optical signals.

18. The integrated optical network according to claim 17, wherein said coupling means include a star coupler.

19. The integrated optical network according to claim 17, further comprising an optical source to supply said input optical signal.

20. An optical transmitter, particularly for use in a radar device, wherein it includes an integrated optical network according to claim 1.

21. An optical network comprising:
- an array of optical waveguides, each optical waveguide having a respective output and the outputs collectively defining an array of radiating elements, each waveguide adapted to receive a respective optical input signal and to output the optical input signal from the corresponding radiating element as a respective optical output signal, the array configured so that the optical output signals interfere with each other to form an optical beam; and
- a phase actuator including a plurality of individual phase control portions, each phase control portion being coupled to a corresponding waveguide in the array and each phase control portion being adapted to receive an electronic control signal, each phase control portion operable in response to the corresponding electronic control signal to adjust a phase of the optical signal propagating through the waveguide such that the phase control portions collectively adjust the optical signals propagating through the waveguides to deflect the optical beam.

22. The optical network of claim 21 wherein each individual phase control portion receives the same electronic control signal.

23. The optical network of claim 21 wherein each phase control portion is operable to adjust a refractive index of the corresponding waveguide to adjust the phase of the corresponding optical signal propagating through the waveguide.

24. The optical network of claim 23 wherein each phase control portion comprises a resistive heating element that adjusts the refractive index of the corresponding waveguide through a thermo-optical effect.

25. The optical network of claim 21 wherein each phase control portion being operable in response to the corresponding electronic control signal to add an incremental phase shift to the optical signal propagating through that waveguide relative to the optical signal propagating through the adjacent prior waveguide.

26. The optical network of claim 25 wherein the phase actuator includes a first group of phase control portions and a second group of phase control portions, and wherein the phase control portions in the first group operate to add the incremental phase shift starting from a first one of the waveguides through an Nth one of the waveguides, and wherein the phase control portions in the second group operate to add the incremental phase shift starting from the Nth one of the waveguides through the first one of the waveguides.

27. An electronic system, comprising:
- an optical transmitter including,
  - an array of optical waveguides, each optical waveguide having a respective output and the outputs collectively defining an array of radiating elements, each waveguide adapted to receive a respective optical input signal and to output the optical input signal from the corresponding radiating element as a respective optical output signals, the array configured so that the optical output signals interfere with each other to form an optical beam; and
  - a phase actuator including a plurality of individual phase control portions, each phase control portion being coupled to a corresponding waveguide in the array and each phase control portion being adapted to receive an electronic control signal, each phase control portion operable in response to the corresponding electronic control signal to adjust a phase of the optical signal propagating through the waveguide such that the phase control portions collectively adjust the optical signals propagating through the waveguides to deflect the optical beam.

28. The electronic system of claim 27 wherein the optical transmitter comprises a radar transmitter.

29. A method of steering an overall optical beam, comprising:
- generating a plurality of optical subbeams, each optical subbeam having a corresponding phase shift;
- propagating each optical subbeam through a corresponding optical medium, each optical medium having an index of refraction;
- outputting each optical subbeam through an array of aligned apertures, each optical subbeam being output through a corresponding aperture of the array; and
- adjusting the index of refraction of each medium responsive to a control signal to adjust the phase shift of each subbeam as a function of the control signal and thereby steer the overall optical beam corresponding to the collective transmissions of the optical subbeams from the array of apertures.

30. The method of claim 29 wherein the control signal continually varies to sweep the overall optical beam back and forth through a fixed angle.

31. The method of claim 29 wherein spacing between the mediums through which the optical subbeams are propagating varies according to an adiabatic function to substantially eliminate losses of the optical subbeams propagating through the mediums.

32. The method of claim 29 wherein the spacing between the mediums is a minimum near the aligned apertures and is a maximum at a fixed distance from the aligned apertures.

* * * * *